No. 808,894. PATENTED JAN. 2, 1906.
A. BERRY.
ADJUSTABLE SUSPENDER FOR ELECTRICAL DEVICES.
APPLICATION FILED JULY 11, 1905.
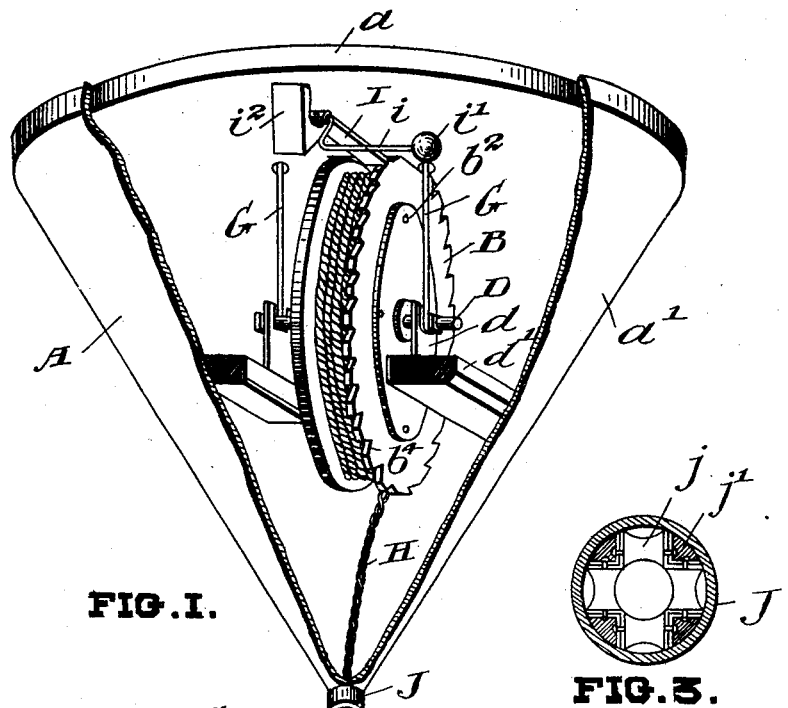
FIG. 1.
FIG. 3.
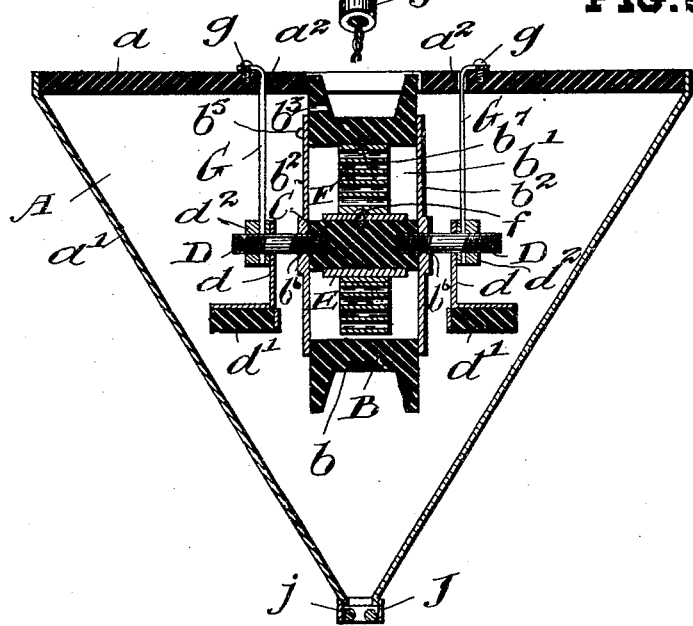
FIG. 2.
WITNESSES
Wm. A. Wyman
R. B. Smart
INVENTOR
A. BERRY
BY Fred B. Feluentenberg
Atty

UNITED STATES PATENT OFFICE.

AUSTIN BERRY, OF OTTAWA, CANADA.

ADJUSTABLE SUSPENDER FOR ELECTRICAL DEVICES.

No. 808,894.  Specification of Letters Patent.  Patented Jan. 2, 1906.

Application filed July 11, 1905. Serial No. 269,257.

*To all whom it may concern:*

Be it known that I, AUSTIN BERRY, manufacturer, of the city of Ottawa, in the county of Carleton, Province of Ontario, Dominion of Canada, have invented certain new and useful Improvements in Adjustable Suspenders for Electrical Devices, of which the following is a specification.

My invention relates to improvements in adjustable suspenders for electrical devices; and the objects of my invention are to provide a device of this class from which an electric light or other electrically-operated device may be suspended by the electric cable or wire and to provide means whereby the length of the said cable or wire may be lengthened or shortened in a simple efficient manner, further objects being to construct the device of as few parts as possible, thus simplifying the operation; and it consists, essentially, of a suitable base, a canopy therefor, a hollow reel or drum constructed of an insulating material, electrically-insulated pintles secured thereto, a spring centrally located in said reel tending to rotate the reel in one direction, means for electrically connecting the terminals of the electrical device to the insulating-pintles, and means for holding the drum or reel in any position to which it has been adjusted, the various parts of the device being constructed and arranged in detail, as hereinafter more particularly described.

Figure 1 shows a perspective view of my suspending device, a portion thereof being in section to more clearly show the construction thereof. Fig. 2 shows a sectional view thereof with a conducting cord or cable removed. Fig. 3 shows a horizontal sectional view through the case inclosing the rollers at the bottom of the opening in the canopy.

In the drawings like letters of reference indicate corresponding parts in each figure.

A represents the outside casing for my suspending device consisting of a suitable base $a$ and a canopy $a'$. The base is constructed of a suitable non-conducting material, such as wood or porcelain.

B is the reel or drum upon which the conducting cord or cable connected to the suspended electrical device is wound in the groove $b$, provided in the periphery thereof. The central portion $b'$ of the said reel or drum is made hollow, as shown. Conducting side plates $b^2$ are secured on each side of the reel or drum inclosing the central hollow space $b'$. The two conducting-wires of the electrical device are wound on the groove $b$ and connected individually to each of these, being led through suitable holes $b^3$ in the flanges of the reel and secured to binding-posts $b^5$ on the side plates or otherwise electrically connected thereto. A plurality of ratchet-shaped teeth $b^4$ are formed on the periphery of one of the flanges of the groove $b$, as shown. A gravity dog or pawl I, pivoted to a bracket $i^2$, suitably secured to the canopy $a'$, is adapted to contact with the said ratchet-shaped teeth $b^4$. A lever $i$ is made integral with or connected to said pawl I and provided at the end thereof with a suitable weight $i'$, whereby the pawl I will be normally gravity-held in contact with the toothed periphery of the reel B.

C is a central non-conducting core freely supported between the side pieces $b^2$, but not secured thereto. Pintles D are secured to each end of this core by suitable means, such as a screw engagement. The pintles D pass through holes $b^6$, provided in the side plates $b^2$, which closely fit the pintles, and so the reel or drum is rotatably supported on the pintles D, the core C and pintles D remaining stationary and the drum $b$ and side plates $b^2$ rotating on them. The pintles D are non-rotatably supported in the brackets $d$, which are secured to cross-beams $d'$, which are supported by the canopy. The rotation of the pintles D may be prevented by any suitable means such as slots in the sides thereof engaging the slots provided in the brackets $d$ or else by the use of a nut-lock.

A ferrule E of a suitable metal may be secured around the core C of smaller width than the said core in order that it might not come in contact with the metallic side plates $b^2$.

F is a helical spring, one end of which is secured to the ferrule E by a screw $f$ or other suitable means, the other end of the said helical spring being connected to the reel or drum by a screw $b^7$ or other suitable means. It will thus be seen that when the reel or drum is rotated in one direction the spring F, having one end attached to the non-rotating core and the other to the rotating drum, will exert a tension tending to rotate it in the opposite direction.

A plurality of conducting-wires G afford electrical connection between binding-posts $g$ and the pintles D, the said conducting-wires being led through apertures $a^2$ in the base of the canopy and being secured to the pintles by nuts $d^2$. From the binding-posts $g$ the circuit is completed to a suitable source of electrical power. Suspending cords or cables H are wound on the reel or drum B and connected individually to the side plates $b^2$, from which electrical contact is afforded to the external binding-posts $b$.

In order to ease the operation of my device, I provide a plurality of friction-rollers $j$, suitably journaled in bearings $j'$, provided in a cap or casing J, which is secured around the bottom openings of the canopy. These rollers may be of any number and are provided with concave surfaces, as shown, whereby the friction of the cord on the opening may be materially reduced.

In the operation of my device the helical spring is so designed that when the electrical device is at its uppermost position there is very little tension therein. When it is desired to lower the device, the pressure is simply exerted on the cord H, unwinding it off the reel. When the device has been lowered the desired amount, the cord is gently released, and the gravity-held pawl I will engage the ratchet-teeth on the periphery of the reel B. When it is desired to raise the electrical device, the cord H is jerked sharply down and then raised quickly. When the device is pulled down sharply, the ratchet-teeth coming in contact with the pawl I in quick succession throw it up in the air, and when the cord is allowed to go up quickly the reel can rotate a considerable distance before the pawl will again come in contact with the ratchet-teeth and stop its upward motion. This process may be repeated until the device reaches the desired position.

In carrying out the construction of my device it may be desirable to make certain changes in the details thereof. I therefore do not limit myself to the specific construction herein shown, but claim the right to claim any and all modifications which may fall within the scope of my invention.

What I claim as my invention is—

1. In an adjustable suspending device for electrical devices the combination with a hollow grooved reel constructed of non-conducting material and having a plurality of ratchet-shaped teeth formed in the periphery of the flange of the groove, of conducting-plates secured thereto, a central non-conducting core, pintles extending in each end thereof, means for non-rotatably supporting said pintles, conducting-cords wound on said reel and connected individually to said side plates, means for affording electrical connection between said side plates and a suitable source of power and a gravity-operated dog adapted to coöperate with said ratchet-teeth as and for the purpose specified.

2. In an adjustable suspending device for electrical devices the combination with the base and canopy having a central opening at the bottom thereof, a hollow reel constructed of non-conducting material, conducting side plates secured thereto a central non-conducting core, pintles secured thereto, brackets non-rotatably supporting said pintles and cross-beams resting on said canopy and supporting said brackets, suspending conducting-cords wound on said reel and connected individually to said side plates and means for affording electrical connection between said side plates and a suitable source of power as and for the purpose specified.

Signed at the city of Ottawa, in the county of Carleton and Province of Ontario, this 7th day of July, 1905.

AUSTIN BERRY.

Witnesses:
RUSSEL S. SMART,
WM. A. WYMAN.